Figure 1:
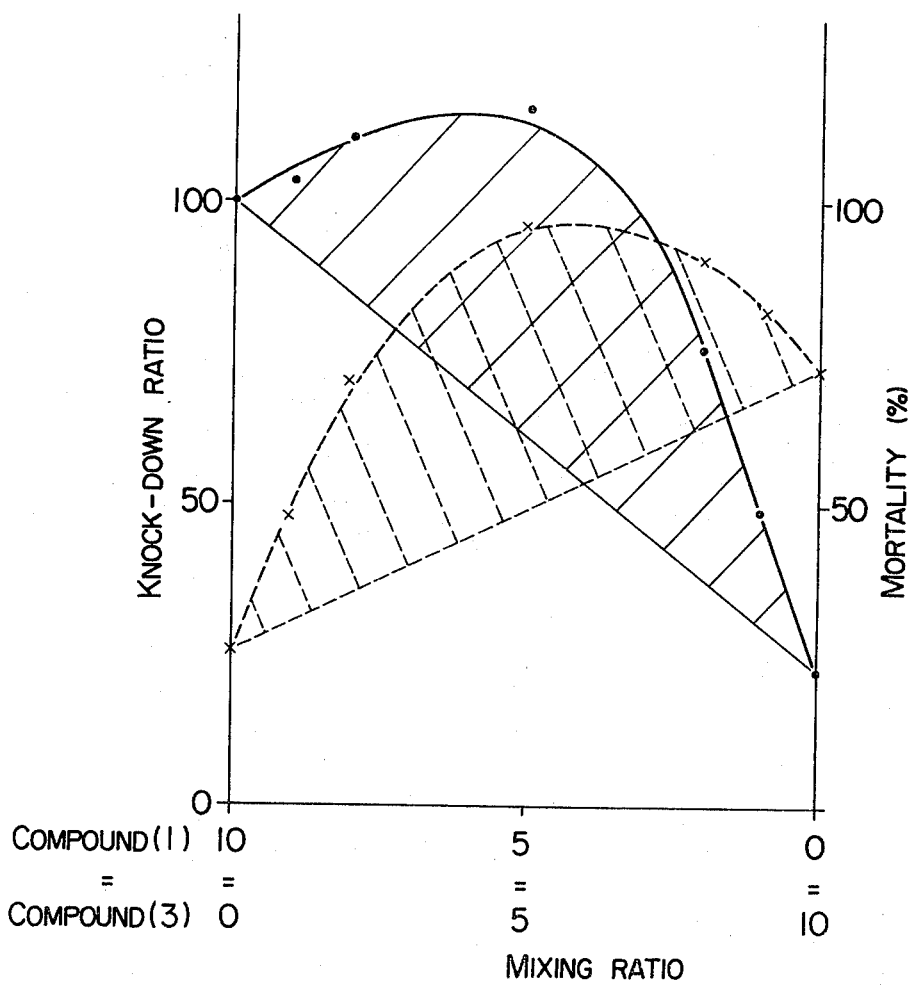

United States Patent [19]

Okuno et al.

[11] 3,899,586

[45] Aug. 12, 1975

[54] SYNERGISTIC CHRYSANTHEMATE INSECTICIDES

[75] Inventors: Yoshitoshi Okuno, Toyonaka; Masachika Hirano, Ashiya, both of Japan

[73] Assignee: Sumitomo Chemical Company, Limited, Osaka, Japan

[22] Filed: Oct. 16, 1974

[21] Appl. No.: 515,332

[30] Foreign Application Priority Data
Oct. 18, 1973 Japan.............................. 48-117497

[52] U.S. Cl. .................. 424/274; 424/40; 424/306
[51] Int. Cl. .......................... A01n 9/22; A01n 9/24
[58] Field of Search............................ 424/306, 274

[56] References Cited
UNITED STATES PATENTS

| | | | |
|---|---|---|---|
| 2,607,796 | 8/1952 | Schechter et al. | 424/306 X |
| 3,268,551 | 8/1966 | Kokamoto et al. | 424/306 X |
| 3,402,179 | 9/1968 | Fujimoto et al. | 424/306 X |
| 3,723,615 | 3/1973 | Okuno | 424/306 X |
| 3,792,079 | 2/1974 | D'Okazio et al. | 424/306 X |

FOREIGN PATENTS OR APPLICATIONS
7,307,130   11/1973   Netherlands

*Primary Examiner*—Albert T. Meyers
*Assistant Examiner*—Leonard Schenkman
*Attorney, Agent, or Firm*—Stevens, Davis, Miller & Mosher

[57] ABSTRACT

An insecticidal composition containing an inert carrier and as active ingredients an insecticidally effective amount of a mixture consisting of N-(3,4,5,6-tetrahydrophthalimido)-methyl chrysanthemate or 2-allyl-3-methyl-cyclopent-2-ene-1-one-4-yl chrysanthemate and 3-phenoxybenzyl-2',2'-dimethyl-3'-(2'',2''-dichlorovinyl) cyclopropanecarboxylate, which has low toxicity to mammals and excellent in both knockdown and killing effects.

9 Claims, 3 Drawing Figures

RELATION BETWEEN MIXING RATIO OF (±)-TRANS BODIES OF COMPOUND NOS.(1) AND (3) AND KNOCK-DOWN RATIO OR MORTALITY

—•— KNOCK-DOWN RATIO
---×--- MORTALITY

RELATION BETWEEN MIXING RATIO OF (+)-LON-(+)-TRANS-BODY OF COMPOUND (2) AND (±)-CIS, TRANS-BODY OF COMPOUND (3), AND KNOCK-DOWN RATIO OR MORTALITY

SYNERGISTIC CHRYSANTHEMATE INSECTICIDES

This invention relates to a novel insecticidal composition containing as active ingredients N-(3,4,5,6-tetrahydrophthalimido)-methyl chrysanthemate [hereinafter referred to as "the compound (1)"] which is a known chrysanthemic acid ester type insecticide, or 2-allyl-3-methyl-cyclopent-2-ene-1-one-4-yl chrysanthemate [hereinafter referred to as "the compound (2)"] which is a known chrysanthemic acid ester type insecticide of allethrolon, and, in admixture therewith, 3-phenoxybenzyl-2',2'-dimethyl-3'-(2'',2''-dichlorovinyl) cyclopropanecarboxylate [hereinafter referred to as "the compound (3)"]. The composition of the present invention, which is prepared by mixing the above-mentioned compounds with each other, is extremely high in insecticidal effect since the demerits of the individual compounds have mutually been filled up due to mixing and the effects thereof have synergistically been increased.

The compound (1) or (2) is a currently available insecticide which displays an extremely quick knock-down effect against sanitary injurious insects such as houseflies, mosquitoes and cockroaches, and agriculture injurious insects such as green rice leafhoppers, and is most quick in knock-down effect among natural and synthetic chrysanthemic acid ester type compounds. However, the said compound, when used singly, is not always high in killing effect and hence is sometimes required to be incorporated with a piperonyl butoxide synergist or an insecticide high in killing effect.

The present inventors conducted extensive studies with an aim to cover the demerits of the compound (1) or (2) while maintaining the merits thereof. As a result, the inventors have found that when the compound (1) or (2) is mixed with a proper amount of the compound (3), the resulting mixture not only shows a synergistic insecticidal activity to display such a surprising effect as not to be anticipated from the effects of the individual compounds but also is so low in activity as to be practically usable. Based on the above finding, the inventors have accomplished the present invention.

The synergistic effect attained by the mixing of the aforesaid compounds is explained below with reference to experimental examples. It is needless to say that the compounds (1), (2) and (3) include their isomers derived from the acid components thereof.

Figure 2:
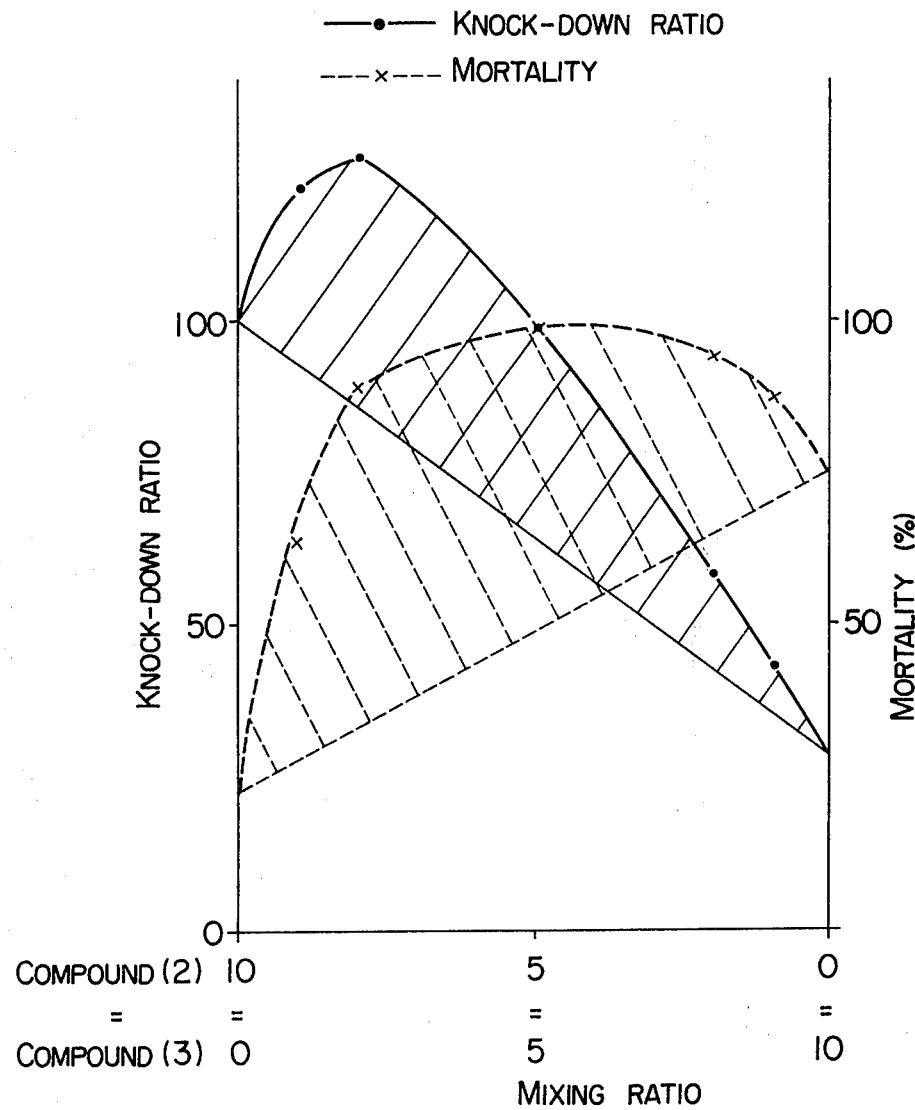
Figure 3:
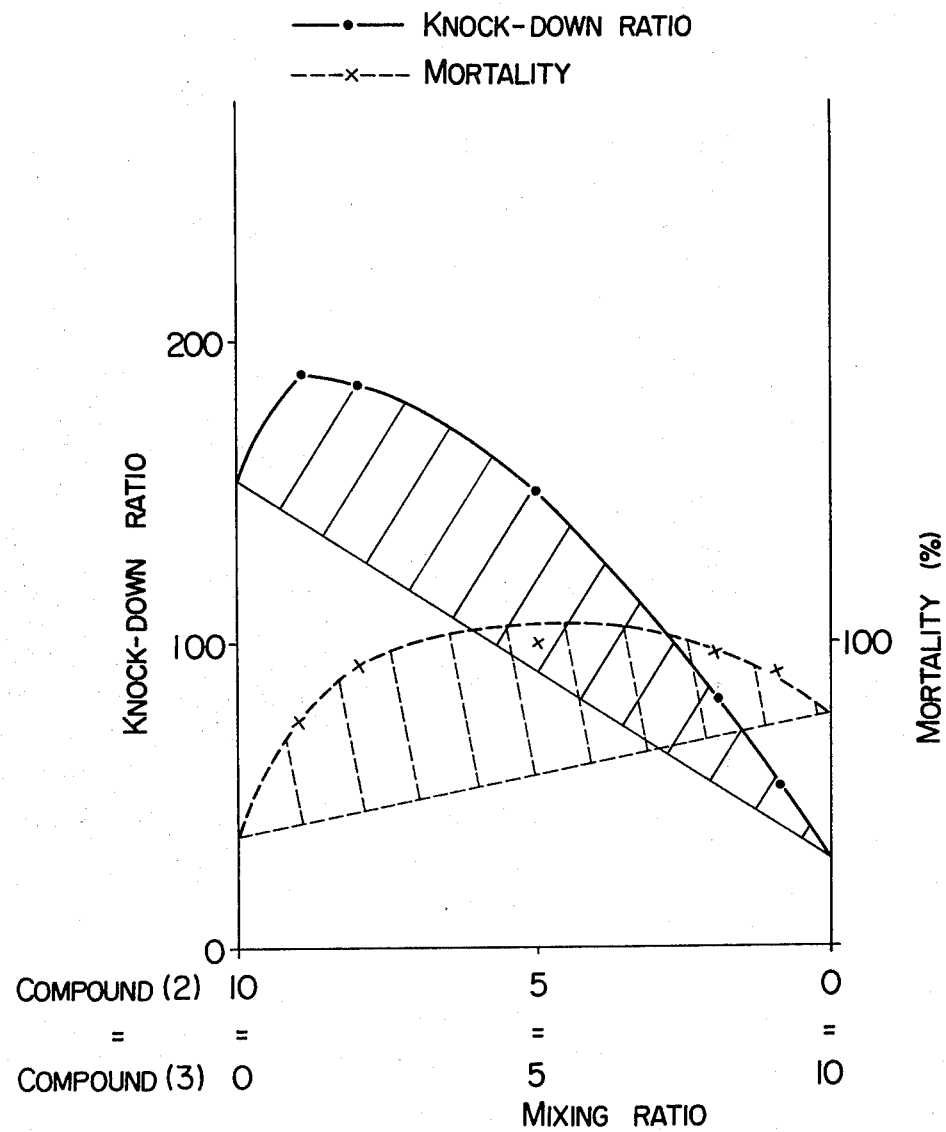

In the accompanying drawings,

FIG. 1 is a graph showing, in terms of the relation between mixing ratio, knock-down ratio and mortality, the effect on housefly adults of a mixed insecticide comprising the (±)-trans bodies of the compounds (1) and (3);

FIG. 2 is a graph showing, in terms of the relation between mixing ratio, knock-down ratio and mortality, the effect on housefly adults of a mixed insecticide comprising a (±)-allethrolon-(+)-trans-acid body of the compound (2) and a (±)-cis,-trans body of the compound (3); and FIG. 3 is a graph showing, in terms of the relation between mixing ratio, knock-down ratio and mortality, the effect on housefly adults of a mixed insecticide comprising a (+)-allethrolon-(+)-trans body of the compound (2) and a (±)-cis,trans body of the compound (3).

EXPERIMENTAL EXAMPLE 1

The compounds and mixtures thereof shown in Table 1 were individually formulated by use of deodorized kerosene into 0.1% oil preparations.

About 50 housefly adults were released in a glass chamber of (70 cm)$^3$ and then sprayed with 0.7 ml. of each of the above-mentioned oil preparations under a pressure of 1.5 kg/cm$^2$ by use of a glass atomizer. Thereafter, the number of knocked down houseflies was counted to calculate the value of $KT_{50}$ (50% knock-down time). After 10 minutes, the knocked down houseflies were collected and allowed to stand for a day in an observation cage with feeding, and then the number of alive and dead houseflies was counted to calculate the mortality. The results obtained were as set forth in Table 1.

Table 1

| 0.1% Oil preparation | | Knock-down effect $KT_{50}$ (sec) | Ratio of effect | Mortality (%) |
|---|---|---|---|---|
| (±)-Trans acid body of compound (1) | | 106 | 100 | 26 |
| " " (3) | | 455 | 23 | 73 |
| (±)-Trans acid body of compound (1) + (±)-Trans acid body of compound (3) | (9:1) | 103 | 103 | 48 |
| " | (8:2) | 96 | 110 | 70 |
| " | (5:5) | 92 | 115 | 96 |
| " | (2:8) | 141 | 75 | 90 |
| " | (1:9) | 216 | 49 | 81 |
| Pyrethrin | | 143 | 74 | 23 |

As is clear from Table 1 shown above and from FIG. 1, the mixtures of the compounds (1) and (3), particularly the 9:1 to 2:8 mixtures, are excellent in synergistic effect.

EXPERIMENTAL EXAMPLE 2

The compounds and mixtures thereof shown in Table 2 were individually formulated by use of deodorized kerosene into 0.2% oil preparations.

About 50 housefly adults were released in a glass chamber of (70 cm)$^3$ and then sprayed with 0.7 ml. of each of the above-mentioned oil preparations under a pressure of 1.5 kg/cm$^2$ by use of a glass atomizer. Thereafter, the number of knocked down houseflies was counted to calculate the value of $KT_{50}$. After 10 minutes, the knocked down houseflies were collected and allowed to stand for a day in an observation cage with feeding, and then the number of alive and dead houseflies was counted to calculate the mortality. The results obtained were as set forth in Table 2.

Table 2

| 0.2% Oil preparation | Knock-down effect $KT_{50}$(sec) | Ratio of effect | Mortality (%) |
|---|---|---|---|
| (±)-Allethrolon-(±)-trans-acid body (hereinafter referred to as "(±)-lon-(+)-trans body") of compound (2) | 125 | 100 | 23 |
| (±)-Allethrolon-(+)-trans-acid body (hereinafter referred to as "(+)-lon-(+)-trans body") of compound (2) | 82 | 153 | 36 |

Table 2—Continued

| 0.2% Oil preparation | | Knock-down effect $KT_{50}$(sec) | Ratio of effect | Mortality (%) |
|---|---|---|---|---|
| (±)-Cis,trans-acid body (hereinafter referred to as "(±)-cis,trans body") of compound (3) | | 447 | 28 | 75 |
| (±)-Lon-(±)-trans body of compound (2) + (±)-Cis,trans body of compound (3) | (9:1) | 102 | 123 | 64 |
| " | (8:2) | 98 | 128 | 90 |
| " | (5:5) | 127 | 98 | 98 |
| " | (2:8) | 212 | 59 | 95 |
| " | (1:9) | 291 | 43 | 87 |
| (+)-Lon-(+)-trans body of compound (2) + (±)-Cis,trans body of compound (3) | (9:1) | 66 | 190 | 75 |
| " | (8:2) | 67 | 187 | 93 |
| (+)-Lon-(+)-trans body of compound (2) + (±)-Cis,trans body of compound (3) | (5:5) | 83 | 151 | 100 |
| " | (2:8) | 156 | 80 | 97 |
| " | (1:9) | 246 | 51 | 92 |

As is clear from the accompanying FIGS. 2 and 3, the lines of knock-down ratio and mortality of mixtures are above the straight line between respective compounds. This means that the mixtures show synergistic effect.

EXPERIMENTAL EXAMPLE 3

(+)-Trans body of the compound (1), (±)-trans body of the compound (3) and the mixtures thereof shown in Table 3 were individually formulated by use of acetone into test chemicals. The test chemicals were tested in insecticidal effect according to topical application method by dropping a trace amount of each of the chemicals onto dorsum prothoraxes of German cockroach adults by use of a microsyringe. As the result, the 50% lethal doses ($LD_{50}$) of the chemicals after 72 hours were as set forth in Table 3.

Table 3

| Test chemical | | $LD_{50}$ (γ/Roach) | Ratio of effect |
|---|---|---|---|
| (+)-Trans body of compound (1) | | 2.43 | 100 |
| (±)-Trans body of compound (3) | | 0.57 | 426 |
| (+)-Trans body of compound (1) + (±)-Trans body of compound (3) | (9:1) | 1.32 | 184 |
| " | (8:2) | 1.05 | 231 |
| " | (5:5) | 0.61 | 398 |
| " | (2:8) | 0.46 | 528 |
| " | (1:9) | 0.59 | 412 |
| Pyrethrin | | 1.40 | 174 |

EXPERIMENTAL EXAMPLE 4

(±)-Cis,trans bodies of the compounds (1) and (3) and the mixtures thereof shown in Table 4 were individually formulated according to an ordinary procedure into 20% emulsifiable concentrates.

Rice plants, which had elapsed about 40 days after sowing in pots, were sprayed with 10 ml/pot of a 2,000-fold dilution of each of the above-mentioned emulsifiable concentrates. After air-drying, the rice plants were parasitized with adults of green rice leafhoppers, the number of knocked down leafhoppers was counted with time to calculate the value of $KT_{50}$ (time required to knock down 50% of the leafhoppers). The results obtained were as set forth in Table 4.

Table 4

| Emulsifiable concentrate | | $KT_{50}$(min) |
|---|---|---|
| (±)-Cis,trans body of compound (1) | | 14' |
| " compound (3) | | 23' |
| (±)-Cis,trans body of compound (1) + (±)-Cis,trans body of compound (3) | (8:2) | 13' |
| " | (5:5) | 17' |
| " | (2:8) | 17' 30" |

EXPERIMENTAL EXAMPLE 5

(±)-Lon-(+)-trans body of the compound (2), (±)-cis,trans body of the compound (3), (+)-trans body of the compound (3) and the mixtures thereof shown in Table 5 were individually formulated in the same manner as in Formulation Example 4 described later into aerosol preparations having such active ingredient concentrations as shown in Table 5.

The aerosol preparations were tested in insecticidal effect according to the aerosol test method [described in "Soap & Chemical Specialities, Bluebook" (1965)], using a Peet Grady's chamber in which had been released a group of 100 housefly adults. The results obtained were as set forth in Table 5.

Table 5

| Aerosol | Sprayed amount (g/1000 ft³) | Knock-down ratio (%) | | | $KT_{50}$ (min) | | Mortality (%) |
|---|---|---|---|---|---|---|---|
| | | 5 min | 10 min | 15 min | Measured | Theoretical*1 | |
| (±)-Lon-(+)-trans body of compound (2) | 0.3% | 15 | 31 | 56 | 13.8 | — | 12 |
| | 3.2 | | | | | | |
| (±)-Cis,trans body of compound (3) | 0.3% | 4 | 22 | 53 | 14.8 | — | 52 |
| | 3.2 | | | | | | |
| (+)-Trans body of compound (3) | 0.3% | 9 | 30 | 67 | 12.4 | — | 76 |
| | 3.1 | | | | | | |
| (±)-Lon-(+)-trans body of compound (2) + (±)-Cis,trans body of compound (3) | 0.2% 0.1% | 22 | 64 | 81 | 8.0 | 14.1 | 85 |
| | 3.2 | | | | | | |
| (±)-Lon-(+)-trans body of compound (2) + (+)-Trans body of compound (3) | 0.2% 0.1% | 28 | 79 | 92 | 6.6 | 13.3 | 95 |
| | 3.1 | | | | | | |

*1: Theoretical value calculated according to the synergistic effect calculation formula of Yun-Pei Sun et al. [J. E. E., 53, pages 887–891 (1960)].

EXPERIMENTAL EXAMPLE 6

(±)-Lon-(+)-trans body of the compound (2), (+)-lon-(+)-trans body of the compound (2), (±)-cis,-trans body of the compound (3) and the mixtures thereof shown in Table 6 were individually formulated in the same manner as in Formulation Example 14 described later into aerosol preparations having such active ingredient concentrations as shown in Table 6.

A glass cylinder of 20 cm in diameter and 20 cm in height was covered at the bottom with a 16-mesh nylon net and coated with butter at the upper part of the inner wall, and then a group of 20 German cockroach adults was liberated in the cylinder. This cylinder was piled on another glass cylinder of 20 cm in diameter and 20 cm in height, and then a glass cylinder of 20 cm in diameter and 40 cm in height was further piled on said cylinder having the cockroaches released therein.

From the top of the thus piled glass cylinder, each of the aforesaid aerosol preparations was sprayed to the cockroaches, and the number of cockroaches knocked down within 20 minutes was counted with time to calculate the value of $KT_{50}$. The cockroaches, when elapsed 20 minutes after being sprayed, were allowed to stand for 3 days with feeding in a feeding dish, and the number of alive and dead cockroaches was counted to calculate the mortality. The results obtained were as set forth in Table 6.

Table 6

| Aerosol | Sprayed amount (g/0.025m³) | Knock-down ratio (%) | | | | $KT_{50}$(min) | | Mortality (%) |
| --- | --- | --- | --- | --- | --- | --- | --- | --- |
| | | 2.5' | 5' | 10' | 20' | Measured | Theoretical*1 | |
| (±)-Lon-(+)-trans body of compound (2) | 0.3% | 0.51 | 16 | 38 | 62 | 84 | 7.1 | — | 30 |
| (+)-Lon-(+)-trans body of compound (2) | 0.3% | 0.50 | 25 | 53 | 84 | 96 | 4.6 | — | 54 |
| (±)-Cis,trans body of compound (3) | 0.3% | 0.51 | 0 | 9 | 32 | 75 | 13 | — | 92 |
| (±)-Lon-(+)-trans body of compound (2) 0.15% + (±)-Cis,trans body of compound (3) 0.15% | | 0.50 | 21 | 45 | 70 | 90 | 5.7 | 9.2 | 100 |
| (+)-Lon-(+)-trans body of compound (2) 0.15% + (±)-Cis,trans body of compound (3) 0.15% | | 0.50 | 33 | 62 | 92 | 100 | 3.6 | 6.8 | 100 |

*1: Same as mentioned previously.

EXPERIMENTAL EXAMPLE 7

(±)-Lon-(+)-cis,trans body of the compound (2), (+)-lon-(+)-cis,trans body of the compound (2), (±)-cis,trans body of the compound (3) and the mixtures thereof shown in Table 7 were individually formulated in the same manner as in Formulation Example 6 described later into mosquito coils having such active ingredient contents as shown in Table 7.

A group of 25 adults of Northern house mosquitoes was released in each of four cylindrical cages made of nylon net of 30 cm in diameter and 30 cm in height. These cages were individually placed at four corners in a (28 m)³ chamber and each of the aforesaid mosquito coils was ignited and placed at the center of the chamber. Subsequently, the number of mosquitoes knocked down within 2 hours was counted with time to calculate the value of $KT_{50}$. The results obtained were as set forth in Table 7.

Table 7

| Mosquito coil | | Knock-down ratio (%) | | | | | | | | $KT_{50}$ (min) | |
| --- | --- | --- | --- | --- | --- | --- | --- | --- | --- | --- | --- |
| | | 15' | 30' | 45' | 60' | 75' | 90' | 105' | 120' | Measured | Theoretical*1 |
| (±)-Lon-(+)-cis,trans body of compound (2) | 0.3% | 3 | 21 | 42 | 59 | 74 | 83 | 88 | | 51 | — |
| (+)-Lon-(+)-cis,trans body of compound (2) | 0.3% | 10 | 37 | 55 | 72 | 80 | 87 | 93 | 97 | 39 | — |
| (±)-Cis,trans body of compound (3) | 0.3% | 0 | 5 | 13 | 30 | 37 | 48 | 72 | 81 | 87 | — |
| (±)-Lon-(+)-cis,trans body of compound (2) 0.2% + (±)-Cis,trans body of compound (3) 0.1% | | 5 | 32 | 58 | 70 | 83 | 90 | 94 | 96 | 41 | 59.1 |
| (+)-Lon-(+)-cis,trans body of compound (2) 0.2% + (±)-Cis,trans body of compound (3) 0.1% | | 19 | 51 | 69 | 81 | 89 | 93 | 96 | 97 | 29.5 | 47.7 |
| (+)-Lon-(+)-cis,trans body of compound (2) 0.15% + (±)-Cis,trans body of compound (3) 0.15% | | 15 | 43 | 61 | 79 | 83 | 90 | 92 | 95 | 34 | 53.7 |

*1: Same as mentioned previously.

As is clear from the above-mentioned Experimental Examples 1 to 7, the mixed insecticides of the present invention are markedly high in insecticidal effect due to synergistic effect.

In preparing the insecticidal compositions of the present invention, the mixed insecticides may be formulated, according to procedures thoroughly known to those skilled in the art using diluents for general insecticides, like in the case of conventional pyrethroids, insecticidal compositions of optional forms such as oil preparations, emulsifiable concentrates, dust preparations, aerosols, wettable powders, fine granule preparations, mosquito coils, electrical mosquito killer mats, fogging mists, heating or non-heating fumigants, and dust or solid preparation incorporated with baits or the like substances attractive to insects.

The mixed insecticides of the present invention can be enhanced in insecticidal effect when used in admixture with such synergits for pyrehroids as α-[2-(2-butoxyethoxy)ethoxy]-4,5-methylenedioxy-2-propyltoluene (hereinafter referred to as "piperonyl butoxide"), 1,2-methylenedioxy-4-[2-(octylsulfinyl)-propyl]benzene (hereinafter referred to as "sulfoxide"), 4-(3,4-methylenedioxyphenyl)-5-methyl-1,3-dioxane (hereinafter referred to as "Sufroxane"), N-(2-ethylhexyl)-bicyclo[2,2,1] hepta-5-ene-2,3-dicarboximide (hereinafter referred to as "MGK-264"), octachlorodipropyl ether (hereinafter referred to as "S-421") and isobornyl thiocyanoacetate (hereinafter referred to as "Thanite"), or with other known synergists effective for allethrin and pyrethrin.

Generally, chrysanthemic acid ester type compounds are somewhat low in stability to light, heat and oxidation. Accordingly, when antioxidants or ultraviolet absorbers, e.g. phenol derivatives such as BHT (butylated hydroxytoluene) and BHA (butylated hydroxyanisole), bisphenol derivatives, arylamines such as phenyl-α-naphthylamine, phenyl-β-naphthylamine and phenetidine condensates, or benzophenone type compounds are added in suitable amounts as stabilizers to the mixed insecticides of the present invention, it is possible to obtain insecticidal compositions which have been more stabilized in effectiveness.

Furthermore, the mixed insecticides of the present invention may be used in admixture with physiologically active substances, e.g. organo-chlorine type insecticides such as DDT, BHC and methoxychlor; organo-phosphorus type insecticides such as O,O-dimethyl-O-(3-methyl-4-nitrophenyl)phosphorothioate [hereinafter referred to as "Sumithion" (registered trademark of Sumitomo Chemical Co., Ltd.)], O,O-dimethyl-O-(2,2-dichlorovinyl) phosphate (hereinafter referred to as "DDVP") and O,O-dimethyl-O-4-cyanophenyl phosphorothioate [hereinafter referred to as "Cyanox" (registered trademark of Sumitomo Chemical Co., Ltd.)]; carbamate type insecticides such as 1-naphthyl-N-methyl carbamate, 3,4-dimethylphenyl-N-methyl carbamate, 3,5-dimethylphenyl-N-methyl carbamate and 2-isopropoxyphenyl-N-methyl carbamate; chrysanthemic acid ester type insecticides such as known chrysanthemic acid esters and their isomers, or other insecticides, or with other agricultural chemicals such as fungicides, nematocides, acaricides, herbicides, fertilizers, microbial pesticides such as BT preparations and BM preparations, and insect hormones, whereby multi-purpose compositions more enhanced in effectiveness can be prepared.

Because of their having such prominent effects as mentioned above, the insecticidal compositions of the present invention find wide uses for the prevention of epidemics by killing sanitary injurious insects such as houseflies, mosquitoes and cockroaches, and for the control of common grain mites, Indian meal moths, rice weevils and the like insects injurious to stored cereals. Furthermore, they are markedly effective not only for the control of agriculture, horticulture and forestry injurious insects such as planthoppers, leafhoppers, stem borers, diamond-back moths, leaf rollers, aphids, spider mites and chestnut caterpillars, but also for the control of lice and ticks parasitic to animals and many other injurious insects. The compositions of the present invention are particularly low in toxicity and hence are excellent also in that they can be freely applied to crops before harvest and to packaging materials for foods, and are safely usable for home horticulture and greenhouse cultivation.

Formulation procedures and effects of the present compositions are illustrated below with reference to Formulation Examples and Test Examples, in which all parts are by weight.

FORMULATION EXAMPLE 1

A mixture comprising 0.06 part of (±)-cis,-trans body of the compound (1) and 0.04 part of (±)-trans body of the compound (3) was dissolved in deodorized kerosene to make the total amount 100 parts, whereby an oil preparation was obtained.

FORMULATION EXAMPLE 2

A mixture comprising 0.04 part of (+)-cis,trans body of the compound (1) and 0.01 part of (±)-trans body of the compound (3) was charged with 0.25 part of piperonyl butoxide and then dissolved in deodorized kerosene to make the total amount 100 parts, whereby an oil preparation was obtained.

FORMULATION EXAMPLE 3

A mixture comprising 4 parts of (±)-cis,trans body of the compound (1) and 16 parts of (±)-cis,trans body of the compound (3) was sufficiently stirred together with 15 parts of Sorpol SM-200 (registered trademark of Toho Chemical Co.) and 65 parts of xylene, whereby an emulsifiable concentrate was obtained.

FORMULATION EXAMPLE 4

A mixture comprising 0.2 part of (±)-cis,trans body of the compound (1), 0.1 part of (+)-trans body of the compound (3), 7 parts of xylene and 7.7 parts of deodorized kerosene was charged in an aerosol container. After attaching a valve portion to the container, 85 parts of a propellant (liquefied petroleum gas) was filled under pressure through said valve portion into the container to obtain an aerosol preparation.

FORMULATION EXAMPLE 5

A mixture comprising 0.2 part of (+)-trans body of the compound (1), 0.1 part of (±)-trans body of the compound (3), 13.7 parts of deodorized kerosene and 1 part of an emulsifier Atmos 300 (registered trademark of Atlas Chemical Co.) was emulsified by addition of 50 parts of pure water. The resulting emulsion was charged, together with a 3:1 mixture of deodorized butane and deodorized propane, into an aerosol container to obtain a water-based aerosol preparation.

FORMULATION EXAMPLE 6

A mixture comprising 0.1 g of (+)-cis,trans body of the compound (1), 0.3 g of (±)-trans body of the compound (3) and 0.4 g of BHT was dissolved in 20 ml. of methanol, and then uniformly mixed under stirring with 99.2 g of a mosquito coil carrier (a 3:5:1 mixture of Tabu powder, pyrethrum marc and wood flour). The resulting mixture, after evaporation of methanol, was sufficiently kneaded with 150 ml. of water, and then shaped and dried to obtain a mosquito coil.

FORMULATION EXAMPLE 7

A mixture comprising 10 parts of (±)-cis,trans body of the compound (1), 20 parts of (±)-cis,trans body of the compound (3) and 5 parts of Sorpol SM-200 (same as mentioned previously) was sufficiently stirred in a mortar together with 65 parts of 300-mesh talc to obtain a wettable powder.

FORMULATION EXAMPLE 8

A mixture comprising 2 parts of (+)-trans body of the compound (1), 1 part of (±)-trans body of the compound (3) and 10 parts of piperonyl butoxide was dissolved in 20 parts of acetone, and sufficiently stirred in a mortar together with 87 parts of 300-mesh diatomaceous earth. Thereafter, acetone was removed by evaporation to obtain a dust preparation.

FORMULATION EXAMPLE 9

A mixture comprising 2 parts of (±)-cis,trans body of the compound (1) and 2 parts of (±)-trans or (±)-cis,trans body of the compound (3) was sufficiently stirred in a mortar together with 5 parts of Toyolignin CT (registered trademark of Toyo Spinning Co.) and 91 parts of GSM Clay (registered trademark of Zieklite Kogyo Co.). The resulting mixture was kneaded with 10% by weight based on the weight of the mixture of water, granulated by means of a granulator and then air-dried to obtain fine granule preparations of the respective compound mixtures.

FORMULATION EXAMPLE 10

A mixture comprising 0.06 part of (+)-Ion-(+)-cis,trans body of the compound (2) and 0.04 part of (±)-trans body of the compound (3) was dissolved in deodorized kerosene to make the total amount 100 parts, whereby an oil preparation was obtained.

FORMULATION EXAMPLE 11

A mixture comprising 0.04 part of (+)-Ion-(+)-trans body of the compound (2) and 0.01 part of (±)-cis,trans body of the compound (3) was charged with 0.25 part of piperonyl butoxide and then dissolved in deodorized kerosene to make the total amount 100 parts, whereby an oil preparation was obtained.

FORMULATION EXAMPLE 12

A mixture comprising 4 parts of (±)-Ion-(±)-cis,trans body of the compound (2) and 16 parts of (±)-cis,trans body of the compound (3) was charged with 15 parts of Sorpol SM-200 and 65 parts of xylene, and the resulting mixture was sufficiently stirred to obtain an emulsifiable concentrate.

FORMULATION EXAMPLE 13

A mixture comprising 0.2 part of (±)-Ion-(+)-cis,trans body of the compound (2), 0.1 part of (+)-trans body of the compound (3), 7 parts of xylene and 7.7 parts of deodorized kerosene was charged in an aerosol container. After attaching a valve portion to the container, 85 parts of a propellant (liquefied petroleum gas) was filled under pressure through said valve portion into the container to obtain an aerosol preparation.

FORMULATION EXAMPLE 14

A mixture comprising 0.2 part of (+)-Ion-(+)-trans body of the compound (2), 0.1 part of (±)-cis,trans body of the compound (3), 13.7 parts of deodorized kerosene and 1 part of an emulsifier Atmos 300 (same as mentioned previously) was emulsified by addition of 50 parts of pure water. The resulting emulsion was charged, together with a 3:1 mixture of deodorized butane and deodorized propane, into an aerosol container to obtain a water-based aerosol preparation.

FORMULATION EXAMPLE 15

A mixture comprising 0.1 g of (±)-Ion-(±)-cis,trans body of the compound (2), 0.3 g of (+)-cis,trans body of the compound (3) and 0.4 g of BHT was dissolved in 20 ml of methanol, and then uniformly mixed under stirring with 99.2 g of a mosquito coil carrier (a 3:5:1 mixture of Tabu powder, pyrethrum marc and wood flour). The resulting mixture, after evaporation of methanol, was sufficiently kneaded with 150 ml of water, and then shaped and dried to obtain a mosquito coil.

FORMULATION EXAMPLE 16

A mixture comprising 0.02 g of (±)-Ion-(+)-trans body of the compound (2) and 0.05 g of (±)-cis,trans body or 0.03 g (+)-trans body of the compound (3) was charged with 0.05 g of BHT and 0.1 g of piperonyl butoxide. The resulting mixture was dissolved in a proper amount of chloroform, and uniformly adsorbed in a filter paper of 3.5 cm × 1.5 cm in area and 0.3 cm in thickness to obtain fibrous fumigant compositions of the respective compound mixtures which were to be used by heating on an electrically heated plate.

In addition to the filter paper, there may be used any fibrous carriers such as pulp and asbestos plates, which are equivalent in effectiveness to the filter paper, to obtain various fumigant compositions of this type.

FORMULATION EXAMPLE 17

A mixture comprising 10 parts of (±)-Ion-(+)-cis,trans body of the compound (2), 20 parts of (±)-cis,trans body of the compound (3) and 5 parts of Sorpol SM-200 (same as mentioned previously) in a mortar together with 65 parts of 300-mesh talc to obtain a wettable powder.

FORMULATION EXAMPLE 18

A mixture comprising 2 parts of (±)-Ion-(+)-trans body of the compound (2), 1 part of (±)-trans body of the compound (3) and 10 parts of piperonyl butoxide was dissolved in 20 parts of acetone, and sufficiently stirred in a mortar together with 87 parts of 300-mesh diatomaceous earth. Thereafter, acetone was removed by evaporation to obtain a dust preparation.

FORMULATION EXAMPLE 19

A mixture comprising 2 parts of (+)-lon-(+)-trans body of the compound (2) and 2 parts of (+)-trans or (+)-cis,trans body of the compound (3) was sufficiently stirred in a mortar together with 5 parts of Toyolignin CT (same as mentioned previously) and 91 parts of GSM Clay (same as mentioned previously). The resulting mixture was kneaded with 10% by weight based on the weight of the mixture of water, granulated by means of a granulator and then air-dried to obtain fine granule preparations of the respective compound mixtures.

Insecticidal effects of the present compositions obtained in the above manner are as described in the following Test Examples.

TEST EXAMPLE 1

About 50 housfly adults were released in a glass chamber of $(70 \text{ cm})^3$ and sprayed with 0.7 ml of each of the oil preparations obtained in Formulation Examples 1, 2 and 10 under a pressure of $1.5 \text{ kg/cm}^2$ by use of a glass atomizer, whereby more than 80% of the flies could be knocked down within 10 minutes.

TEST EXAMPLE 2

According to the Campbell's turn table method ["Soap & Sanitary Chemicals", Vol. 14, No. 6, page 119 (1938)], 5 ml of each of the oil preparations obtained in Formulation Examples 1, 2, 10 and 11 was sprayed, and a group of about 100 housefly adults was exposed to the descending mist for 10 minutes. As the result, the death of more than 80% of the flies could be observed on the next day.

TEST EXAMPLE 3

Each of the emulsifiable concentrates obtained in Formulation Examples 3 and 12 was diluted with water to form a 20,000-fold dilution. 2 Liters of the dilution was charged in a styrene case of 23 cm in width, 30 cm in length and 6 cm in depth, and about 100 last-instar larvae of Northern house mosquitoes were liberated in the case. As the result, the death of more than 90% of the larvae could be observed on the next day.

TEST EXAMPLE 4

Rice plants, elapsed 45 days after sowing, were grown in 1/50,000 Wagner pots, and sprayed with 10 ml/pot of an aqueous 500-fold dilution of each of the emulsifiable concentrates obtained in Formulation Examples 3 and 12. Subsequently, each pot was covered with a wire net, and about 30 adults of green rice leafhoppers were liberated in the net. As the result, the death of more than 90% of the leafhoppers could be observed on the next day.

TEST EXAMPLE 5

In a glass Petri dish of 14 cm in diameter were put 10 tobacco cutworm larvae at the third to forth instar stage, and 1 ml. of an aqueous 200-fold dilution of each of the emulsifiable concentrates obtained in Formulation Examples 3 and 12 to the larvae by use of a spraying tower.

Thereafter, the larvae were transferred to another Petri dish with baits. As the result, the death of more than 90% of the cutworm larvae could be observed on the next day.

TEST EXAMPLE 6

Insecticidal effects on housefly adults of the aerosol preparations obtained in Formulation Examples 4, 5, 13 and 14 were tested according to the aerosol test method [described in "Soap & Chemical Specialities, Bluebook" (1965)] using a Peet Grady's chamber (6 ft)$^3$. As the result, all the aerosol preparations could knock down more than 80% of the flies within 15 minutes after the spraying and could bring more than 70% of the flies to death on the next day.

TEST EXAMPLE 7

About 50 adults of Northern house mosquitoes were released in a glass chamber of $(70 \text{ cm})^3$, and a small electric fan of 13 cm in diameter equipped in the chamber was put in motion. Subsequently, 0.1 g of each of the mosquito coils obtained in Formulation Examples 6 and 15 was ignited on one end and placed at the center of the chamber bottom. As the result, all the mosquito coils could knock down more than 90% of the mosquitoes and could bring more than 80% thereof to death on the next day.

TEST EXAMPLE 8

About 50 houseflies were released in a glass chamber of $(70 \text{ cm})^3$, and a small electric fan (13 cm in diameter) equipped in the chamber was put in motion. Subsequently, the heating fumigant composition obtained in Formulation Example 16 was placed on an electrically heated plate and fumigated in the chamber. As the result, more than 90% of the houseflies could be knocked down within 20 minutes.

TEST EXAMPLE 9

Each of the dust preparations obtained in Formulation Examples 9 and 18 was uniformly sprinkled in a proportion of 2 g/m$^2$ on the bottom of a Petri dish of 14 cm in diameter, and then butter was coated on the inner wall of the dish, except the portion of 1 cm from the bottom. Subsequently, a group of 10 adult German cockroaches was liberated in the dish and contacted with the dust preparation for 30 minutes, whereby more than 90% of knocked down cockroaches could be killed during 3 days after the contact.

TEST EXAMPLE 10

Into 10 liters of water in a 14-liter polyethylene-made pail was charged 1 g of each of the granule preparations obtained in Formulation Examples 9 and 19. After one day, about 100 last-instar larvae of Northern house mosquitoes were liberated in said water, and the alive and dead of the larvae were observed with time. As the result, more than 90% of the larvae could be killed within 24 hours.

TEST EXAMPLE 11

3 Grams of each of the oil preparations obtained in Formulation Examples 2 and 11 was fogged by means of an insect fogger (manufactured by Burgess Vibrocrafters, Inc., U.S.A.) into the same Peet Grady's chamber as in Test Example 6 into which about 500 houseflies had previously been released. As the result, more than 90% of the houseflies could be knocked down within 30 minutes.

TEST EXAMPLE 12

Chinese cabbages were grown in a green house, and were artificially parasitized with cutworms, cabbage worms and diamond-back moths. Thereafter, the green house (2 m in height) was divided into compartments of (30 m²) in area, and each compartment was fumigated by use of a thermofumigator (SEARCH) with 10 g of each of the wettable powders obtained in Formulation Examples 7 and 17. As the result, no increasing damage of the cabbages was substantially observed.

TEST EXAMPLE 13

Mottled kidney bean plants (at the stage of 2-leaves), which had elapsed 9 days after sowing in flower pots, were parasitized with 10 to 15 female carmine mites per leaf, and then allowed to stand for a week in a thermostat at 27°C, whereby the mites at various growth stages propagated in large numbers. At this stage, an aqueous 200-fold dilution of each of the emulsifiable concentrates obtained in Formulation Examples 3 and 12 was sprayed to the plants in a proportion of 10 ml per pot, using a turn table. After 10 days, the plants were examined to find no substantial damage.

TEST EXAMPLE 14

An aqueous 100-fold dilution of each of the wettable powders obtained in Formulation Examples 7 and 17 was applied in a proportion of 50 ml/m² onto the surface of a plywood of 15 cm × 15 cm in area. On the other hand, a group of 20 adults of Northern house mosquitoes was released in a Petri dish of 9 cm in diameter. This dish was placed upside down on the plywood surface treated with the said chemical to contact the mosqitoes with the treated surface and, after 60 minutes, the number of knocked down mosquitoes was counted.

In the above manner, the chemical applied to the plywood surface was examined in knock-down effect on the day of application and thereafter once a week. As the result, the chemical showed a knockdown effect of more than 80% even after 4 weeks had elapsed from the day of application to the plywood surface, and thus was excellent in residual effect.

What we claim is:

1. An insecticidal composition containing an inert carrier and as active ingredients an insecticidally effective amount of a mixture consisting of (1) N-(3,4,5,6-tetrahydrophthalimido)-methyl chrysanthemate or (2) 2-allyl-3-methyl-cyclopent-2-ene-1-one-4-yl chrysanthemate and (3) 3-phenoxybenzyl-2',2'-dimethyl-3'-(2'',2''-dichlorovinyl) cyclopropanecarboxylate wherein the ratio of compounds (1) or (2) to compound (3) is 2:8 to 8:2.

2. The insecticidal composition according to claim 1, wherein said composition contains 0.05 to 90% by weight of the active ingredients.

3. The insecticidal composition according to claim 1, wherein the mixture consists of compound (1) and compound (3).

4. The insecticidal composition according to claim 1, wherein the mixture consists of compound (2) and compound (3).

5. The insecticidal composition according to claim 4, wherein compound (2) is (±)-2-allyl-3-methyl-cyclopent-2-ene-1-one-4-yl (+)-trans-chrysanthemate.

6. The insecticidal composition according to claim 4, wherein compound (2) is (+)-2-allyl-3-methyl-cyclopent-2-ene-1-one-4-yl (+)-trans-chrysanthemate.

7. The insecticidal composition according to claim 1, wherein compound (3) is 3-phenoxybenzyl-(±)-cis,trans-2',2'-dimethyl-3'-(2'',2''-dichlorovinyl) cyclopropanecarboxylate.

8. The insecticidal composition according to claim 1, wherein compound (3) is 3-phenoxybenzyl-(+)-trans-2',2'-dimethyl-3'-(2'',2''-dichlorovinyl) cyclopropanecarboxylate.

9. A method for knocking down and killing insects, which comprises contacting the insects with an insecticidally effective amount of the composition of claim 1.

* * * * *